United States Patent

Brahm et al.

Patent Number: 5,563,207
Date of Patent: Oct. 8, 1996

[54] WATER-DISPERSIBLE POLYISOCYANATE COMPOSITIONS

[75] Inventors: Martin Brahm, Engelskirchen; Wolfgang Kremer, Kerken; Lutz Schmalstieg, Köln; Joachim Probst; Werner Kubitza, both of Leverkusen, all of Germany

[73] Assignee: Bayer Aktiengesellschaft, Leverkusen, Germany

[21] Appl. No.: 428,753

[22] Filed: Apr. 25, 1995

[30] Foreign Application Priority Data

May 6, 1994 [DE] Germany .................... 44 16 113.1

[51] Int. Cl.$^6$ ................ C08J 3/00; C08K 3/20; C08L 75/00
[52] U.S. Cl. ............ 524/591; 524/507; 524/590; 524/839; 525/123; 525/455; 528/49; 528/67; 252/182.2
[58] Field of Search .................... 524/591, 839, 524/590, 507; 525/123, 455; 528/49, 67; 252/182.2

[56] References Cited

U.S. PATENT DOCUMENTS

| | | | |
|---|---|---|---|
| 3,996,154 | 12/1976 | Johnson et al. | 252/312 |
| 4,413,112 | 11/1983 | Reiff et al. | 528/73 |
| 4,433,095 | 2/1984 | Hombach et al. | 524/563 |
| 4,472,550 | 9/1984 | Reiff et al. | 524/589 |
| 4,663,377 | 5/1987 | Hombach et al. | 524/196 |
| 5,075,370 | 12/1991 | Kubitza et al. | 524/591 |
| 5,200,489 | 4/1993 | Jacobs et al. | 528/49 |
| 5,252,696 | 10/1993 | Laas et al. | 528/49 |
| 5,331,039 | 7/1994 | Blum et al. | 524/507 |
| 5,336,711 | 8/1994 | Schneider et al. | 524/507 |

FOREIGN PATENT DOCUMENTS

| | | |
|---|---|---|
| 013112 | 7/1980 | European Pat. Off. . |
| 59-191770 | 10/1984 | Japan . |
| 1444933 | 8/1976 | United Kingdom . |
| 1584865 | 2/1981 | United Kingdom . |
| 93/05087 | 3/1993 | WIPO . |
| 93/09157 | 5/1993 | WIPO . |

*Primary Examiner*—Paul R. Michl
*Assistant Examiner*—Patrick Niland
*Attorney, Agent, or Firm*—Joseph C. Gil; Thomas W. Roy

[57] ABSTRACT

Water-dispersible polyisocyanate compositions based on aliphatic and aromatic diisocyanates and having an NCO content, based on solids, of 6 to 21% by weight, a weight ratio of incorporated TDI units to incorporated HDI units of 6:1 to 0.1:1 and a content of ethylene oxide units, arranged within terminal polyether chains, of 5 to 40% by weight; a method for the preparation of these polyisocyanate compositions by reacting a polyisocyanate component with monovalent polyether alcohols containing ethylene oxide units at an NCO/OH equivalent ratio of 2:1 to 120:1; and aqueous coating compositions containing these polyisocyanate compositions and polyhydroxyl compounds as the binder.

8 Claims, No Drawings

WATER-DISPERSIBLE POLYISOCYANATE COMPOSITIONS

BACKGROUND OF THE INVENTION

1. Field of the Invention

The present invention relates to nonionically, hydrophilically modified polyisocyanate compositions prepared from both aliphatic and aromatic diisocyanates, a method for their preparation, and an aqueous coating composition containing these polyisocyanate compositions.

2. Description of the Prior Art

The ecological compatibility of coatings and coating compositions is playing an increasingly important role in surface technology. One problem is the reduction of the quantities of organic solvents used in coatings and coating compositions. An important contribution to the resolution of this problem is being made by the aqueous two-component polyurethane coatings which have become known in recent times. These systems permit the production of high-quality coatings, exactly like the corresponding two-component, solvent borne polyurethane coatings.

Aqueous two-component polyurethane coatings are described, for example, in EP-A 0,358,979, EP-A 0,543,228, EP-A 542,105 and in the PCT Applications published under the publication numbers 9305087 and 9309157. The compositions of EP-A 0,358,979 are based on selected water-soluble or water-dispersible acrylic resins and preferably low molecular weight aliphatic polyisocyanates. The coatings of this prior publication dry relatively slowly, so that they are of only limited suitability for fields of application where rapid drying is critical, such as the varnishing of wood and furniture.

These comments also apply to the two-component systems of Japanese Patent Application 58-66736, published under unexamined application number 191770/1984. The coating compositions described in this prior publication, based on tests carried out by the inventors, show totally inadequate film-forming properties, i.e., mat films having severe surface defects are invariably obtained. In addition, drying times of three days are necessary even when aromatic polyisocyanates are used.

Based on these observations, it is an object of the present invention to provide new, aqueous two-component polyurethane coating compositions have an acceptable processing time, and yet cure at room temperature as rapidly as the known, solvent-containing two-component polyurethane coatings of the prior art.

This object may be achieved by using the polyisocyanate compositions according to the invention, described in more detail below, as the polyisocyanate component in aqueous two-component polyurethane coating compositions as set forth herein. The polyisocyanate compositions according to the invention contain both aliphatic and aromatic diisocyanates in chemically incorporated form. The aromatic diisocyanates are preferably part of the polyisocyanates which contain isocyanurate groups, while the aliphatic diisocyanates in particular can be part of the conventional lacquer polyisocyanates.

The preparation of water-dispersible polyisocyanates by the reaction of diisocyanates with monofunctional polyethylene oxide polyethers is described in a series of publications such as EP-A 0,013,112, EP-A 0,061,628, DE-OS 2,908,844, DE-OS 2,921,681, DE-OS 4,136,618, GB-PS 1,444,933, US-PS 3,996,154 and U.S. Pat. No. 5,200,489. HDI and TDI are among the suitable starting diisocyanates mentioned. However, none of the these publications disclose hydrophilically modified polyisocyanate compositions in which both HDI and TDI are present in chemically incorporated form. Consequently, the advantages of the polyisocyanates compositions according to the invention are not disclosed in these prior publications. These advantages include not only the favorable properties previously set forth but also a particularly marked, outstanding compatibility with the aqueous polyacrylic dispersions, which are preferably employed in aqueous two-component polyurethane coating compositions.

SUMMARY OF THE INVENTION

The present invention relates to water-dispersible polyisocyanate compositions based on aliphatic and aromatic diisocyanates and a) having a content of isocyanate groups (MW 42) of 6 to 21% by weight, based on solids, b) containing a mixture of
  b1) at least of one modified polyisocyanate prepared from toluene diisocyanate (TDI) (MW 174) and containing isocyanurate groups, urethane groups, allophanate groups and/or uretdione groups and
  b2) at least of one modified polyisocyanate prepared from hexamethylene diisocyanate (HDI) (MW 168) and containing isocyanurate groups, urethane groups, allophanate groups, uretdione groups and/or biuret groups, in a weight ratio of the TDI units present in the modified polyisocyanates of b1) to the HDI units present in the modified polyisocyanates of b2) of 6:1 to 0.1:1 and c) having a content of ethylene oxide units (MW 44) arranged within terminal polyether chains of 5 to 40% by weight, wherein the polyether chains have an average of 6 to 50 ethylene oxide units.

The present invention also relates to a process for the preparation of these polyisocyanate compositions by reacting at an NCO/OH equivalent ratio of 2:1 to 120:1

A) a polyisocyanate component having an NCO content of 12 to 25 by weight and containing
  A1) modified polyisocyanates prepared from TDI and containing isocyanurate groups, urethane groups, allophanate groups and/or uretdione groups and
  A2) modified polyisocyanates prepared from HDI and containing isocyanurate groups, urethane groups, allophanate groups uretdione groups and/or biuret groups, with B) a monovalent polyether component selected from monovalent polyether alcohols having an average of 6 to 50 alkylene oxide units in which at least 70 mol-% of these units are ethylene oxide units and C) optionally other alcohols.

Finally, the present invention relates to an aqueous two-component polyurethane coating composition having a binder which contains I) a water dispersible polyisocyanate composition according to the invention and II) a polyhydroxyl component which is soluble or dispersible in water, in amounts corresponding to an NCO/OH equivalent ratio of 0.5:1 to 5:1.

DETAILED DESCRIPTION OF THE INVENTION

In accordance with the present invention, the abbreviation "HDI" stands for hexamethylene diisocyanate and the abbreviation "TDI" stands for any isomers or isomeric mixtures of toluene diisocyanate, particularly the commercially available isomers or isomeric mixtures such as 2,4-diisocyanatotoluene and mixtures thereof with up to 35% by weight, based on the weight of the mixture, of 2,6-diisocyanatotoluene.

Polyisocyanate component A) is based on modified polyisocyanates prepared from TDI and HDI. The weight ratio of the TDI polyisocyanates to the HDI polyisocyanates in component A), i.e., the weight ratio b) in the polyisocyanate compositions according to the invention, is 6:1 to 0.1:1, preferably 4:1 to 0.2:1 and more preferably 2:1 to 0.25:1. The NCO content of component A), based on solids, is preferably 12 to 25% by weight, more preferably from 15 to 23% by weight.

Component A) is a mixture of at least one component A1) containing chemically incorporated TDI units and at least one component A2) containing chemically incorporated HDI units. However, the exclusive use, e.g, of mixed trimers of TDI and HDI as component A is also possible. This mixed trimer satisfies the requirements of both components A1) and A2). An example of such a mixed trimer is available from Bayer AG under the tradename Desmodur HL.

Modified polyisocyanates which can be used as component A1) according to the invention include TDI derivatives containing isocyanate groups. Examples of these derivatives include polyisocyanates containing isocyanurate groups, urethane groups, allophanate groups and/or uretdione groups. TDI-based polyisocyanates containing isocyanurate groups are preferred. An example of this preferred polyisocyanate is available from Bayer AG under the tradename Desmodur IL.

Modified polyisocyanates which are suitable for use as component A2) include HDI derivatives containing isocyanate groups. Examples of these derivatives include polyisocyanates containing isocyanurate groups, urethane groups, allophanate groups, uretdione groups and/or biuret groups. HDI-based polyisocyanates containing biuret groups or isocyanurate groups are preferred; more preferred are the HDI derivatives which contain isocyanurate groups.

The TDI derivatives containing isocyanurate groups, which are particularly preferred as component A), generally have an NCO content, based on solids, of 14 to 23% by weight. The NCO content of the HDI derivatives, which are preferred for use as component A2), in particular the HDI derivatives which contain isocyanurate groups, is generally 17 to 24% by weight. The viscosity of the HDI derivatives at 100% solids is preferably below 10,000 mPa.s/23° C.

Component A) containing individual components A1) and A2) can be prepared, for example, by mixing together the individual components. However, component A) can also be prepared, for example, by trimerizing TDI in the presence of the HDI derivatives, preferably HDI trimers as the reaction medium. The trimerization of TDI predominates due to the greater reactivity TDI compared to HDI. The previously prepared, comparatively inactive HDI components, serve as the reaction medium, so that a mixture of the individual components A1) and A2) is formed directly.

The modified polyisocyanates based on TDI and/or HDI are prepared by known methods as described, for example, in DE-PS 1,644,809, DE-OS 2,616,415, EP-A 0,377,177, EP-A 0,398,749, EP-A 0,496,208, EP-A 0,524,501, EP-A 0,524,500, US-PS 3,001,973, U.S. Pat. No. 3,903,127, US-PS 4,614,785, and from the journal "Farben und Lack", 75 (1969), page 976 or from H. Wagner, H. F. Sarx, Lackkunstharze, fifth edition, page 168 ff,. Carl Hanser Verlag, Munich, 1971.

The polyalkylene oxide polyether alcohols B) are monovalent polyether alcohols or mixture thereof having 6 to 50, preferably 7 to 25, alkylene oxide units, which contain at least 70 mol-%, preferably at least 80 mol-% and more preferably 100 mol-% of ethylene oxide units. Besides ethylene oxide units, other alkylene oxide units, preferably propylene oxide units, may be present in the monovalent polyether alcohols. The polyether alcohols are prepared in a known manner by the alkoxylation of monovalent alcohols. Linear alcohols as well as branched and cyclic alcohols can be employed as starters. $C_1$–$C_4$ alcohols are particularly preferred such as n-butanol, n-propanol, isopropanol, ethanol and especially methanol. In accordance with the present invention, "terminal polyether chains" mean polyether chains which have been incorporated through the use of component B) in the polyisocyanate compositions according to the invention.

Alcohol component C) is selected from alcohols which are different from component B) and have a molecular weight of 32 to 900. Examples include monofunctional alcohols such as methanol, ethanol, the isomeric propanols, butanols, pentanols, hexanols, heptanols, octanols, nonanols, decanols, dodecanols, saturated and unsaturated fatty alcohols; diols such as ethylene glycol, propylene glycol, the isomeric butanediols, pentanediol, hexanediol, octanediol, dodecanediol and dimeric fatty alcohols; triols such as glycerol, trimethylolpropane, trimethylolethane and trimeric fatty alcohols; and higher functional polyols such as pentaerythritol and sorbitol. Mixtures of these alcohols may also be used. Preferably alcohol component C) is used in an amount of less than 0.3, more preferably less than 0.15, equivalents per one equivalent of polyisocyanate component A).

To prepare the polyisocyanate formulation according to the invention polyisocyanate A), optionally dissolved in inert solvents, is reacted with polyether component B) and optionally component C), while maintaining an NCO/OH equivalent ratio of 2:1 to 120:1, preferably 4:1 to 60:1 and more preferably 5:1 to 20:1, at a temperature of 20° to 100° C., preferably at 40° to 80° C., to form urethanes.

Examples of suitable solvents are the known lacquer solvents such as ethyl acetate, butyl acetate, ethylene glycol monomethyl ether acetate, ethylene glycol monoethyl ether acetate, methoxypropyl acetate, 2-butanone, cyclohexanone, acetone, toluene, xylene or mixtures thereof.

Other solvents are also suitable, such as propylene glycol diacetate, diethylene glycol dimethyl ether, diethylene glycol ethyl ether acetate, diethylene glycol butyl ether acetate, N-methyl-pyrrolidone and N-methylcaprolactam, or mixtures of thee solvents with each other or with the solvents mentioned above.

The proportion of organic solvents should not exceed 50% by weight, preferably 40% by weight, more preferably 35% by weight, based on the weight of the reaction mixture. It is preferable to dispense with solvents completely when solvent-free isocyanate components A) are used.

The type and proportions of the starting components are selected such that the resulting polyisocyanate mixtures have a) an isocyanate group content, based on solids (calculated as NCO, molecular weight 42) of 6% to 21%, preferably from 8 to 18%, b) a ratio of TDI units b1) to HDI units b2) of 6:1 to 0.1:1, preferably 4:1 to 0.2:1 and more preferably from 2:1 to 0.25:1 and c) a content of ethylene oxide units arranged within terminal polyether chains of 5 to 40% by weight, preferably 10 to 30% by weight and more preferably 15 to 25% by weight.

The polyisocyanate compositions according to the invention are used in the coating compositions according to the invention in the form of solutions or solvent-free. The compositions can be easily emulsified in water without the use of high shear forces. Stable emulsions are formed in which the reaction of the isocyanate groups proceeds surprisingly slowly. The emulsions generally have a pot life of several hours without precipitation or sedimentation.

The two-component polyurethane coating compositions according to the invention contain the polyisocyanate compositions according to the invention as the cross-linking component of the binder. The second binder component in the coating compositions is a polyhydroxyl component, which is soluble or dispersible in water, has an average hydroxyl functionality of at least 2 and contains at least one polyhydroxyl compound, which is soluble or dispersible in water, has a number average molecular weight ($M_n$) of 500 to 50,000 and has a hydroxyl number of 150 to 300. The number average molecular weight can be determined by gel permeation chromatography using polystyrene as the standard.

Examples of the second binder component include polyurethanes, polyether polyols, polyester polyols and acrylic resins, which are soluble or dispersible in water and contain hydroxyl groups. Also suitable are polyols which contain urethane groups, ester groups and/or carbonate groups, which are soluble or dispersible in water and contain hydroxyl groups.

The use of vinyl polymer polyols which are soluble or dispersible in water is preferred. These vinyl polymer polyols contain sulphonate and/or carboxylate groups, preferably carboxylate groups and optionally sulphonic acid groups and/or carboxyl groups, preferably carboxyl groups, and have a number average molecular weight ($M_n$) of 500 to 50,000, a hydroxyl number of 16.5 to 264 mg KOH/g and an acid number, based on all of the carboxyl groups and/or sulphonic acid groups of 4 to 156 mg KOH/g of solid resin. 10 to 100% of the carboxyl groups and sulphonic acid groups are present in the form of salts.

These polymers containing hydroxyl groups are prepared by known radical polymerization, for example, solution polymerization, emulsion polymerization or suspension polymerization. Solution polymerization and emulsion polymerization are preferred.

In addition to the polyisocyanate formulation according to the invention and in order to alter the properties, for example, to render the coating elastic, other polyisocyanates which may or may not have been made hydrophilic may be used. Examples include polyisocyanates based on hexamethylene diisocyanate or isophorone diisocyanate having biuret groups, isocyanurate groups, uretdione groups, allophanate groups and/or urethane groups. These additional polyisocyanates, if present at all, are present in a maximum amount 100% by weight, preferably a maximum amount of 50% by weight, based on the weight of the polyisocyanate compositions according to the invention. It is particularly preferable not to use these additional polyisocyanates.

In the two-component polyurethane coating compositions according to the invention, the polyisocyanate compositions according to the invention (and optional additional polyisocyanates) and the compounds containing hydroxyl groups (based on their alcoholic hydroxyl groups) are present in quantities which correspond to an NCO/OH equivalent ratio of 0.5:1 to 5:1, preferably 0.8:1 to 2:1.

The water content of the coating compositions in the form of aqueous solutions or particularly of dispersions is generally from 35 to 80% by weight, preferably from 40 to 70% by weight. The content of solvents is generally from 0 to 15% by weight.

The coating compositions according to the invention may contain known additives in addition to the binders, water and solvents mentioned. These additives include nonfunctional aqueous binders to obtain specific properties such as additives to improve bonding, levelling agents, pigments, fillers, flatting agents, thickeners, defoaming agents and external emulsifiers.

The coating compositions according to the invention exhibit surprisingly rapid drying even at room temperature, so that the polyisocyanate mixtures according to the invention are recommended particularly for use in the wood and furniture industries. Because of the short cycle times required for industrial application, it is desirable that grinding is as rapid as possible in the case of this intended use.

However, it is of course also possible to dry the aqueous two-component polyurethane coating compositions according to the invention at an elevated temperature or by stoving at temperatures of up to 200° C.

The coating compositions according to the invention are particularly suitable for coating of any water-resistant flat substrates. Examples include flat objects made of wood, fixing plates, metal, glass, stone, ceramic materials, concrete, rigid and flexible plastics, textiles, leather and paper. The substrates may optionally be provided with conventional primers prior to coating.

The two-component polyurethane coatings produced using the polyisocyanate mixtures according to the invention are distinguished not only by their rapid drying at ambient temperature, but also by their outstanding optical properties such as surface gloss, flow and transparency.

The following examples serve to illustrate the invention further. All parts and percentages are by weight, unless indicated otherwise. The data relating to the TDI/HDI ratio also refers to the weight ratio of these components.

EXAMPLES

Example 1

Preparation of a polyisocyanate composition according to the invention 101.9 g of a monofunctional polyethylene oxide polyether, started on methanol and having an average molecular weight of 550, was added dropwise at 50° C. to 508.6 g (2.1 g equiv) of an HDI/TDI-based trimer which contains butyl acetate (solids content: 60%, NCO content: 10.5%, viscosity: 2,200 mPa.s, Desmodur HL, a commercial product of Bayer AG, Leverkusen), following the addition of 0.1 g of benzoyl chloride. The mixture was stirred at 50° C. until a constant NCO content of 7.2% was attained.

The solvent-containing polyisocyanate formulation obtained had the following characteristic data:

Solids content: 66.7%

NCO content: 7.2%

Viscosity: 3,200 mPa.s/23° C.

Ethylene oxide content: 25%

Ratio TDI/HDI: 1.8:1

Example 2

Preparation of a polyisocyanate composition according to the invention 73.5 g of decanol, together with 217 g of a monofunctional polyethylene oxide polyether, started on methanol and having an average molecular weight of 550, was added dropwise at 50° C. to 1,067 g of the trimer of Example 1. The mixture was stirred at 50° C. until a constant NCO content of 6.0% was attained. The solvent-containing polyisocyanate formulation obtained had the following characteristic data:

Solids content: 68.5%

NCO content: 6.0%

Viscosity: 2,600 mPa.s/23° C.

Ethylene oxide content: 23%

Ratio TDI/HDI: 1.8

Example 3

Preparation of a polyisocyanate composition according to the invention 142 g of a monofunctional polyethylene oxide polyether, started on methanol and having an average molecular weight of 550, was added dropwise at 50° C. to 443 g of a TDI-based trimer which contains butyl acetate (solids content: 51%, NCO content: 8.0%, viscosity: 1,600 mPa.s, Desmodur Ill. 1351, a commercial product of Bayer AG, Leverkusen), and 502 g of a solvent-free HDI-based trimer (NCO content: 21.5%, viscosity: 3,000 mPa.s, Desmodur N 3300, a commercial product of Bayer AG, Leverkusen), and stirring was continued until a constant NCO content of approx. 12.2% was attained.

The solvent-containing polyisocyanate formulation obtained had the following characteristic data:

Solids content: 80%

Viscosity at 23° C.: 1,400 mPa.s

NCO content: 12.2%

Ethylene oxide content: 16.6%

Ratio TDI/HDI: 0.45

Example 4

(Comparison)—Preparation of a polyisocyanate composition from a trimer based on TDI not according to the invention 114 g of a monofunctional polyethylene oxide polyether, started on methanol and having an average molecular weight of 550, was added dropwise at 50° C. to 982 g of the TDI-based trimer of Example 3, and stirring was continued until a constant NCO content of approx. 6.4% was attained.

The solvent-containing polyisocyanate formulation obtained had the following characteristic data:

Solids content: 56.1%

Viscosity at 23° C.: 1,100 mPa.s

NCO content: 6.4%

Ethylene oxide content: 18.5%

Example 5

(Comparison)—Polyisocyanate composition not according to the invention from a trimer based on HDI as in Example 1 of DE-OS 4,136,618 (U.S. Pat. No. 5,252,696)

Solids content: 100%

Viscosity at 23° C.: 3,050 mPa.s

NCO content: 17.3%

Example 6

Preparation of a water-dispersible vinyl polymer 10,000 g of n-butyl acetate was placed in a 127 liter autoclave. The material was then flushed with nitrogen and the autoclave was closed. The material was then heated to 110° C. with stirring. Thereafter a mixture of monomers containing 17,488 g of 2-hydroxyethyl methacrylate, 9,944 g of methyl methacrylate, 22,860 g of n-butyl acrylate and 4,572 g of acrylic acid as well as a solution of 1,905 g of azobisisobutyronitrile in 29,718 g of n-butyl acetate were added simultaneously and evenly over 4 hours. After the materials had been added, the reaction mixture was post-activated by means of a solution of 381 g of t-butyl-per-2-ethyl hexanoate in 762 g of n-butyl acetate. Stirring was continued for 4 hours and then the polymer solution was combined with a mixture of 2,591 g of 25% aqueous ammonia and 112 kg of deionized water. Afterwards n-butyl acetate together with water and residual monomers were removed by distillation under a vacuum of 200 to 400 mbar and at a temperature of 50° to 70° C. Water was then added in a quantity such that a 30%, very finely divided dispersion was formed.

Characteristic data:

Solids content: 30%

Viscosity at 23° C.: approx. 10,000 mPa.s/23° C.

OH content: 4.0%, based on solid resin

Example 7

Preparation of an aqueous two-component coating composition 78 parts by weight of the vinyl polymer from Example 6, 0.83 parts by weight of a commercially available thickener (Acrysol RM8 from Rohm and Haas) and 0.5 parts by weight of a commercially available defoaming agent (Byk 023 from Byk-Chemie) were carefully mixed, with the addition of 16.3 parts by weight of water. The resulting product, which is suitable for the production of a water-dilutable two-component coating composition, had a virtually unlimited storage stability.

29.5 parts by weight of the polyisocyanate composition from Example 1 were added to the preceding starting component, as well as 10 parts by weight of water to adjust the processing consistency, and the constituents were intimately mixed. A processable, water-dilutable, two-component, polyurethane coating composition was obtained, which was applied to a clean glass plate in a wet film thickness of 200 µm.

Processing time: greater than 1 hour

Sand drying: 70 min.

Appearance: high-gloss transparent coating with good flow

Pendulum hardness: 124 s (3 hours after application)

Example 8

Preparation of an aqueous two-component coating composition 35.4 parts by weight of the polyisocyanate composition from Example 2 were added to 78 parts by weight of the starting component described in Example 7 and, after intimate mixing, was adjusted to processing consistency by adding 9 parts by weight of water. A processable, water-dilutable, two-component, polyurethane coating composition was obtained, which was applied to a clean glass plate in a wet film thickness of 200 µm.

Processing time: greater than 1 hour

Sand drying: 66 min.

Appearance: high-gloss transparent coating

Pendulum hardness: 132 s (3 hours after application)

Example 9

(Comparison)—Preparation of an aqueous two-component coating composition 33 parts by weight of the polyisocyanate composition from Example 4, which was not according to the invention, was added to 78 parts by weight of the starting component described in Example 7 and, after intimate mixing, was adjusted to processing consistency by adding 10 parts by weight of water. A processable, water-dilutable, two-component, polyurethane coating composition was obtained, which was applied to a clean glass plate in a wet film thickness of 200 μm.

Processing time: less than 20 min.

Sand drying: 50 min.

Appearance: highly opaque, cracked coating with surface defects

Pendulum hardness: not measurable

Example 10

(Comparison)—Preparation of an aqueous two-component coating composition 15.4 parts by weight of the polyisocyanate composition from Example 5, which was not according to the invention, was added to 78 parts by weight of the starting component described in Example 7 and, after intimate mixing, was adjusted to processing consistency by adding 32 parts by weight of water. A processable, water-dilutable, two-component, polyurethane coating composition was obtained, which was applied to a clean glass plate in a wet film thickness of 200 μm.

Processing time: greater than 1 hour

Sand drying: 116 min.

Appearance: slightly opaque, streaky coating

Pendulum hardness: 26 s (3 hours after application)

Example 11

Preparation of a water-dispersed vinyl polymer 400 g of methoxypropyl acetate was placed in a 3 liter stirred autoclave fitted with an inlet and outlet for nitrogen. The material was vigorously flushed with nitrogen and then heated to 145° C. with stirring. A mixture of 508 g of hydroxypropyl methacrylate (addition product of propylene oxide and methacrylic acid), 160 g of acrylic acid, 1000 g of methyl methacrylate and 252 g of n-butyl acrylate together with an initiator solution (containing 67 g of di-t-butyl peroxide in 100 g of methoxypropyl acetate) were added simultaneously and evenly over 4 hours. The reaction mixture was then cooled to an internal temperature of 140° C. and post-activated with 13 g of di-t-butyl peroxide. The polymer solution was then combined with an aqueous neutralizing solution (containing 90.7 g of 25% ammonia in 3,000 ml of water) in a 6 liter stirred flask. The aqueous/organic dispersion was stirred homogeneously, then distilled at a pressure of 100 to 300 mbar, during which the methoxypropyl acetate solvent and the residual monomers were removed.

An almost transparent dispersion having the following characteristic data was obtained:

Solids content: 33.2% by weight

Viscosity: 3,000 mPa.s (23° C.)

OH content: 3.0% by weight, based on solids

Example 12

Preparation of an aqueous two-component coating composition 100 parts by weight of the hydroxy-functional acrylic resin from Example 11 was carefully mixed in water with 0.7 parts by weight of a 25% aqueous solution of a commercially available emulsifier (Emulgator VVN from Bayer AG) and 2.6 parts by weight of a 20% solution of a commercially available polyurethane thickener (Acrysol RM8 from Rohm and Haas). The resulting starting component for the production of a water-dilutable two-component coating composition had a virtually unlimited storage stability.

45.4 parts by weight of the polyisocyanate from Example 2 and 30 parts by weight of water were added to this starting component. After intensive mixing a processable, aqueous, two-component, polyurethane coating composition was obtained, which was applied to a clean glass plate in a wet film thickness of 120 μm.

Processing time: greater than 1 hour

Hand drying: 17 min.

Appearance: clear glossy coating

Example 13

Preparation of an aqueous two-component coating composition 24.2 parts by weight of the polyisocyanate from Example 3 and 29 parts by weight of water were added to 100 parts by weight of the starting component from Example 12. After intensive mixing a processable, aqueous, two-component, polyurethane coating composition was obtained, which was applied to a clean glass plate in a wet film thickness of 120 μm.

Processing time: greater than 2 hours

Hand drying: 20 min.

Appearance: clear glossy coating

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A water-dispersible polyisocyanate composition based on aliphatic and aromatic diisocyanates and
    a) having a content of isocyanate groups (MW 42) of 6 to 21% by weight, based on polyisocyanate solids,
    b) containing a mixture of
        b1) at least one polyisocyanate prepared from toluene diisocyanate (TDI) (MW 174) and containing isocyanurate groups, urethane groups, allophanate groups and/or uretdione groups and
        b2) at least one polyisocyanate prepared from hexamethylene diisocyanate (HDI) (MW 168) and containing isocyanurate groups, urethane groups, allophanate groups, uretdione groups and/or biuret groups, in a weight ratio of the TDI units present in the polyisocyanates of b1) to the HDI units present in the polyisocyanates of b2) of 6:1 to 0.1:1 and
    c) having a content of ethylene oxide units (MW 44) arranged within terminal polyether chains of 5 to 40% by weight, based on polyisocyanate solids, wherein the polyether chains have an average of 6 to 50 ethylene oxide units.

2. The water-dispersible polyisocyanate composition of claim 1 which has
    a) a content of isocyanate groups of 8 to 18% by weight, based on polyisocyanate solids and
    b) a weight ratio of the TDI units present in the polyisocyanates of b1) to the HDI units present in the polyisocyanates of b2) of 4:1 to 0.2:1.

3. The water-dispersible polyisocyanate composition of claim 1 which has a weight ratio of the TDI units present in the polyisocyanates of b1) to the HDI units present in the polyisocyanates of b2) of 2:1 to 0.25:1.

4. The water-dispersible polyisocyanate composition of claim 1 in which component b1) comprises a polyisocyanate containing isocyanurate groups.

5. The water-dispersible polyisocyanate composition of claim 2 in which component b1) comprises a polyisocyanate containing isocyanurate groups.

6. The water-dispersible polyisocyanate composition of claim 3 in which component b1) comprises a polyisocyanate containing isocyanurate groups.

7. An aqueous two-component polyurethane coating composition having a binder which comprises
  I) a water-dispersible polyisocyanate composition based on aliphatic and aromatic diisocyanates and
    a) having a content of isocyanate groups (MW 42) of 6 to 21% by weight, based on polyisocyanate solids,
    b) containing a mixture of
      b1) at least one polyisocyanate prepared from toluene diisocyanate (TDI) (MW 174) and containing isocyanurate groups, urethane groups, allophanate groups and/or uretdione groups and
      b2) at least one polyisocyanate prepared from hexamethylene diisocyanate (HDI) (MW 168) and containing isocyanurate groups, urethane groups, allophanate groups, uretdione groups and/or biuret groups, in a weight ratio of the TDI units present in the polyisocyanates of b1) to the HDI units present in the polyisocyanates of b2) of 6:1 to 0.1:1 and
    c) having a content of ethylene oxide units (MW 44) arranged within terminal polyether chains of 5 to 40% by weight, based on polyisocyanate solids, wherein the polyether chains have an average of 6 to 50 ethylene oxide units, and
  II) a polyhydroxyl component which is soluble or dispersible in water, in amounts corresponding to an NCO/OH equivalent ratio of 0.5:1 to 5:1.

8. The aqueous two-component polyurethane coating composition of claim 7 in which component II) is an acrylic resin having a number average molecular weight ($M_n$) of 500 to 50,000.

* * * * *